United States Patent
Kim

(10) Patent No.: US 10,105,599 B2
(45) Date of Patent: *Oct. 23, 2018

(54) METHOD AND SYSTEM FOR RENEWING SCREEN

(71) Applicant: GAME AND TECHHNOLOGY CO., LTD., Gimpo-si (KR)

(72) Inventor: Dae Il Kim, Jeollanam-do (KR)

(73) Assignee: GAME AND TECHNOLOGY CO., LTD., Gimpo-si (KR)

( * ) Notice: Subject to any disclaimer, the term of this patent is extended or adjusted under 35 U.S.C. 154(b) by 264 days.

This patent is subject to a terminal disclaimer.

(21) Appl. No.: 14/731,006

(22) Filed: Jun. 4, 2015

(65) Prior Publication Data

US 2015/0268816 A1 Sep. 24, 2015

Related U.S. Application Data

(63) Continuation of application No. 13/228,325, filed on Sep. 8, 2011, now Pat. No. 9,076,356, which is a
(Continued)

(30) Foreign Application Priority Data

Jun. 29, 2004 (KR) .......................... 10-2004-0049556

(51) Int. Cl.
*A63F 13/52* (2014.01)
*G09G 5/00* (2006.01)
(Continued)

(52) U.S. Cl.
CPC .............. *A63F 13/52* (2014.09); *A63F 13/23* (2014.09); *A63F 13/35* (2014.09);
(Continued)

(58) Field of Classification Search
None
See application file for complete search history.

(56) References Cited

U.S. PATENT DOCUMENTS 5,047,755 A 9/1991 Morita et al.
5,351,067 A 9/1994 Lumelsky et al.
(Continued)

FOREIGN PATENT DOCUMENTS

KR 96-013369 10/1996
KR 1998-015968 5/1998
(Continued)

OTHER PUBLICATIONS

Non-Final Office Action dated Aug. 25, 2009 in U.S. Appl. No. 11/571,356.
(Continued)

*Primary Examiner* — Jwalant Amin
(74) *Attorney, Agent, or Firm* — Sughrue Mion, PLLC

(57) ABSTRACT

There is provided a screen update method and system including: identifying image resource data associated with a first image update event from a predetermined basic recording space in case that the first image update event occurs; loading the identified image resource data in a buffer space including buffers, in which the image resource data are loaded in rotation on the buffer by a frame, respectively; sequentially determining the image resource data loaded on the buffer for each the buffer, rendering the determined image resource data, and generating a first image at a first frame rate; generating a second image associated with a second image update event at a second frame rate in case that the second image update event occurs; compositing the first image with the second image to generate an entire image; and a sixth step of displaying the entire image on a predetermined display means.

19 Claims, 6 Drawing Sheets

Related U.S. Application Data continuation of application No. 11/571,356, filed as application No. PCT/KR2005/002018 on Jun. 28, 2005, now Pat. No. 8,035,649.

(51) Int. Cl.
  *A63F 13/23*    (2014.01)
  *A63F 13/35*    (2014.01)
  *A63F 13/5375*  (2014.01)
  *A63F 13/822*   (2014.01)
  *A63F 13/87*    (2014.01)
  *A63F 13/95*    (2014.01)
  *G06F 3/0481*   (2013.01)
  *G06F 3/0482*   (2013.01)
  *G09G 5/393*    (2006.01)

(52) U.S. Cl.
  CPC ........ *A63F 13/5375* (2014.09); *A63F 13/822* (2014.09); *A63F 13/87* (2014.09); *A63F 13/95* (2014.09); *G06F 3/0482* (2013.01); *G06F 3/04815* (2013.01); *G09G 5/00* (2013.01); *A63F 2300/203* (2013.01); *A63F 2300/305* (2013.01); *A63F 2300/5553* (2013.01); *A63F 2300/572* (2013.01); *A63F 2300/65* (2013.01); *A63F 2300/6607* (2013.01); *A63F 2300/807* (2013.01); *G09G 5/393* (2013.01)

(56) References Cited

U.S. PATENT DOCUMENTS

| | | | |
|---|---|---|---|
| 5,841,439 A * | 11/1998 | Pose | G06T 15/005 |
| | | | 345/418 |
| 6,002,385 A | 12/1999 | Silverbrook | |
| 6,075,532 A * | 6/2000 | Colleran | G09G 5/00 |
| | | | 345/473 |
| 6,147,695 A * | 11/2000 | Bowen | G06T 3/40 |
| | | | 345/503 |
| 6,487,565 B1 | 11/2002 | Schechter et al. | |
| 6,888,550 B2 * | 5/2005 | Ramsay, III | G09G 3/003 |
| | | | 345/539 |
| 7,034,791 B1 | 4/2006 | Odom | |
| 7,272,785 B2 * | 9/2007 | Fukuda | G06F 17/212 |
| | | | 707/E17.121 |
| 8,035,649 B2 | 10/2011 | Kim | |
| 2003/0016225 A1 * | 1/2003 | Ramsay, III | G09G 3/003 |
| | | | 345/543 |
| 2003/0080971 A1 | 5/2003 | Hochmuth et al. | |
| 2003/0095705 A1 * | 5/2003 | Weast | G06T 11/001 |
| | | | 382/167 |
| 2004/0051920 A1 | 3/2004 | Cameron | |
| 2005/0137015 A1 * | 6/2005 | Rogers | A63F 13/12 |
| | | | 463/42 |
| 2005/0184993 A1 | 8/2005 | Ludwin et al. | |
| 2006/0089199 A1 | 4/2006 | Jordan et al. | |
| 2006/0242596 A1 | 10/2006 | Armstrong | |
| 2007/0099702 A1 | 5/2007 | Tupper | |

FOREIGN PATENT DOCUMENTS

| | | |
|---|---|---|
| KR | 10-0196686 | 2/1999 |
| KR | 2001-0031608 | 4/2001 |
| KR | 10-0295712 | 5/2001 |
| KR | 2001-0047622 | 6/2001 |
| KR | 2001-0110841 | 12/2001 |
| KR | 2003-0026927 | 4/2003 |

OTHER PUBLICATIONS

Final Office Action dated Feb. 1, 2010 in U.S. Appl. No. 11/571,356.
Non-Final Office Action dated Jun. 22, 2010 in U.S. Appl. No. 11/571,356.
Final Office Action dated Dec. 13, 2010 in U.S. Appl. No. 11/571,356.
Notice of Allowance dated Jun. 13, 2011 in U.S. Appl. No. 11/571,356.
Non-Final Office Action dated Jun. 22, 2012 in U.S. Appl. No. 13/228,325.
Non-Final Office Action dated Oct. 25, 2012 in U.S. Appl. No. 13/228,325.
Final Office Action dated Feb. 4, 2013 in U.S. Appl. No. 13/228,325.
Non-Final Office Action dated May 24, 2013 in U.S. Appl. No. 13/228,325.
Final Office Action dated Oct. 4, 2013 in U.S. Appl. No. 13/228,325.
Non-Final Office Action dated Mar. 27, 2014 in U.S. Appl. No. 13/228,325.
Non-Final Office Action dated Aug. 18, 2014 in U.S. Appl. No. 13/228,325.
Notice of Allowance dated Feb. 27, 2015 in U.S. Appl. No. 13/228,325.

* cited by examiner

METHOD AND SYSTEM FOR RENEWING SCREEN

CROSS-REFERENCE TO RELATED APPLICATIONS

This application is a continuation of U.S. patent application Ser. No. 13/228,325, filed on Sep. 8, 2011, and U.S. patent application Ser. No. 11/571,356, filed on Dec. 27, 2006, now U.S. Pat. No. 8,035,649, which is the National Stage Entry of International Application No. PCT/KR2005/002018, filed on Jun. 28, 2005, and claims priority from and the benefit of Korean Patent Application No. 10-2004-0049556, filed on Jun. 29, 2004, all of which are hereby incorporated by reference for all purposes as if fully set forth herein.

BACKGROUND OF THE INVENTION

Field of the Invention

The present invention relates to a screen update method and system, and more particularly, to a screen update method and system, in which two sorts of images are generated at a different update period by methods different from each other and the two images are composed to update a screen.

Discussion of the Background

The present invention relates to a screen update method and system, and more particularly, to a screen update method and system, in which two sorts of images are generated at a different update period by methods different from each other and the two images are composed to update a screen.

The real-time rendering is updating a screen by generating image from image resource data in real time. Generally, the real-time rendering means that an image is updated at an update speed not less than 15 [frames/second] such that a user looking at the image senses interactivity. Particularly, there are many cases in a network game service that a game screen having a rapid update speed of 30 [frames/second] in order to provide a natural game screen to a gamer.

However, in case that a three-dimensional image is rendered in real time, and particularly, a three-dimensional image is rendered in real time at a high update speed in a game screen, since not only the amount of image resource data to be processed in unit time is large but also the amount of computation processed by a graphic processing unit (GPU) is sharply increased, a method of keeping an update speed of 30 [frames/second] is greatly required.

However, in case that an image forming a game screen is generated, a process of generating the image can be divided into various steps and there exists not only a case in which each of the steps is performed in time series but also each of the step is performed in parallel.

In case that a process of generating an image is formed of Step A, Step B, and Step C and Step B is not performed till Step A is completed but Step C is performed in parallel regardless of Step A or Step C, Step C is performed in a short time because the amount of computation is not great but the image may be not generated because Step A is not completed. Namely, Step A and Step B determine the update speed of the image.

For example, in a 3D Massively Multi-player Online Role Playing Game (MMORPG) in which a plurality of garners access via network and game, a process of updating a 3D object such as the movement of a player character is included in a step having a large amount of computation, such as Step A and a process of displaying the content of a chat text inputted by a gamer on a screen is included in a step having a small amount of computation and rapidly processed by a video processor, such as Step C.

In this case, since the movement of the player character and the content of the chat text are displayed in "one image", if Step C for displaying the content of the chat text is rapidly processed and completed, the content of the chat text is not updated till Step A for displaying the movement of the player character is completed.

Accordingly, in case that the real-time rendering is not normally processed and a lack phenomenon occurs because a bottleneck phenomenon occurs or the amount of computation for the real-time rendering is rapidly increased, though Step C is completed, an unnatural game screen, even a freeze picture, is provided to a gamer due to a delay of Step A.

DISCLOSURE OF INVENTION

Technical Goals

According to the present invention, there is provided a screen update method and system, in which at least two sorts of images which can be respectively generated by different processors by using different methods are generated at a different update speed and the at least two images are composed, thereby updating a full image.

According to the present invention, there is also provided a screen update method and system, in which respective processes to be processed for embodying a full image are divided for each update speed and independently processed, thereby preventing the update speed of the full image from being reduced together with a slowest process.

According to the present invention, there is provided a screen update method and system, in which an image area that has to be rapidly responded to a request of a gamer, such as displaying the content of a chat text and displaying the movement of a mouse point can be updated at higher speed in rendering a game screen and if a lack is generated in generating a three-dimensional image, there is no bad effect in updating the image.

Technical Solutions

To achieve the goals and solve the problems of conventional methods, the present invention provides a screen update method including: a first step of identifying image resource data associated with a first image update event from a predetermined basic recording space in case that the first image update event occurs; a second step of loading the identified image resource data in a buffer space including a plurality of buffers, in which the image resource data are loaded in rotation on the buffer by a frame, respectively; a third step of sequentially determining the image resource data loaded on the buffer for each the buffer, rendering the determined image resource data, and generating a first image at a first frame rate; a fourth step of generating a second image associated with a second image update event at a second frame rate in case that the second image update event occurs; a fifth step of compositing the first image with the second image to generate an entire image; and a sixth step of displaying the entire image on a predetermined display means.

According to an aspect of the present invention, there is provided. A screen update system, including: a basic recording space for storing image resource data; an identification means identifying image source data associated with a first image update event from the basic recording space in case that the first image update event occurs; a loading means sequentially loading the identified image resource data for each buffer by a frame in a buffer space including a plurality of the buffers; a first image generating means sequentially determining the image resource data loaded on the buffer, rendering the determined image resource data, and generating a first image at a first frame rate; a second image generating means generating a second image associated with a second image update event at a second frame rate in case that the second image update event occurs; and a display means generating an entire image by compositing the first image with the second image and displaying the entire image on a predetermined display means.

Terms Used in the Present Specification

1) First Image

A first image is generated at a predetermined first frame rate, which is generated via loading predetermined image resource data and rendering the image resource data. Namely, the first image is a 3-D image generated via general real-time rendering.

2) Second Image

A second image is generated at a predetermined second frame rate, which can be generated in s relatively shorter time than the first image. For example, the second image includes an image for displaying the content of a chat on a screen according to the input of a chat text, performed by a user, or displaying a mouse point on a screen according to the movement of a mouse, performed by a user.

3) First Frame Rate and Second Frame Rate

As described above, since the second image can be generated in a relatively shorter time than the first image, a second update period is generally shorter than a first update period. For example, the first frame rate and the second frame rate may be determined such that the second image is updated at an update speed of 60 [frames/second] and the first image is updated at an update speed of 30 [frames/second].

4) Loaded in Rotation on a Buffer

A processor means loads image resource data in rotation on a plurality of buffers from a basic recording space. For example, in a case where two buffers such as a first buffer and a second buffer are used, the image resource data is sequentially loaded on each of the buffers, such as the first buffer→the second buffer→the first buffer→, which is indicated as a term of "loaded in rotation".

5) Image Resource Data

Image resource data includes data used for rendering in order to update a screen, which are used for embodying dynamic characters such as a player character and a Non-Player Character (NPC) and static characters forming the scenery of a game, such as mountains and rivers.

DETAILED DESCRIPTION OF THE ILLUSTRATED EMBODIMENTS

Best Mode for Carrying Out the Invention

Hereinafter, a screen update method and system will be described in detail with reference to the attached drawings.

Figure 1:
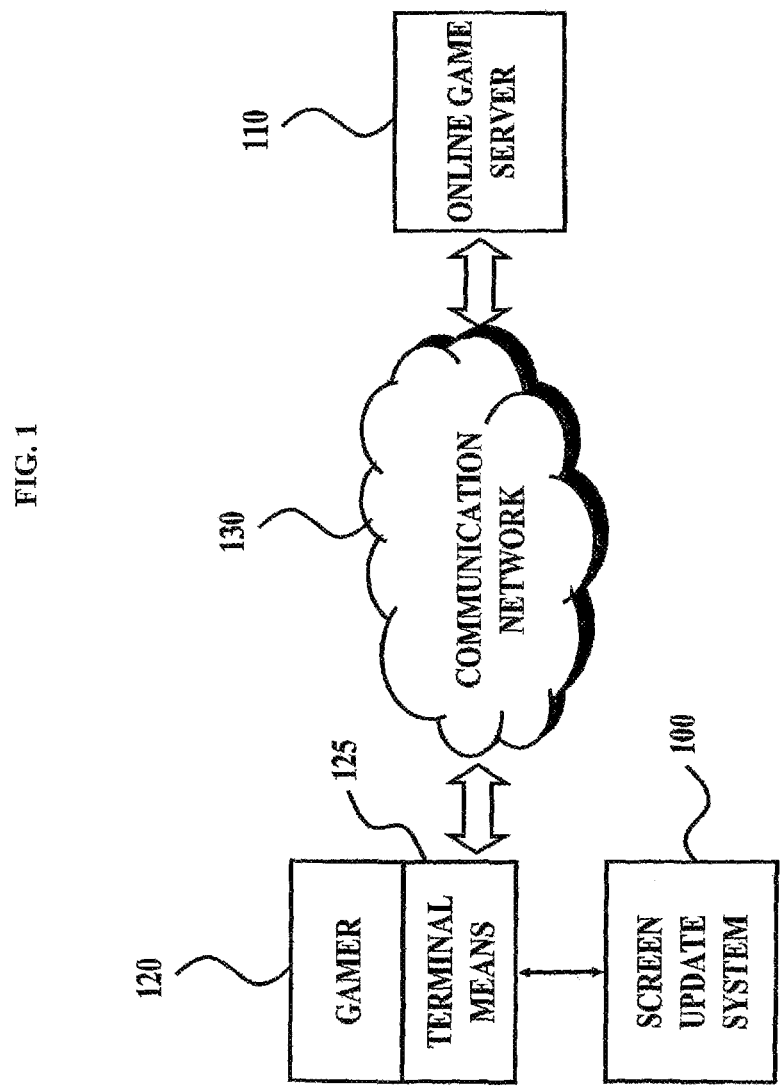
FIG. 1 is a diagram illustrating a network connection of a system performing a screen update method according to the present invention.

FIG. 1 is a diagram illustrating a network connection of the screen update system performing the screen update method according to the present invention. Hereinafter, though it is described as an example that the screen update system updates a game screen, the present invention may be applied to all of updating screen by using real-time rendering in addition to the game screen.

A screen update system 100 is an apparatus for updating a screen by generating an image associated with an image update event when the image update event with respect to a predetermined game area is generated. The screen update system 100 may be embodied in a terminal means 125 driving a Role Playing Game (RPG) requiring embodying various images with respect to image resource data according to a position of a player character, and more particularly, a Massively Multi-player Online Role Playing Game (MMORPG) in which a plurality of gamers simultaneously run a game via online in broadband game area. Though it is illustrated that the screen update system 100 of the present invention is embodied in the RPG, it is clear to those skilled in the art that the screen update system 100 may be applied to all image realization fields associated with image realization on a display means. Also, the screen update system 100 may be embodied in the inside or outside of the terminal means 125. In the present invention, it is illustrated for convenience of description that the screen update system 100 is installed in a predetermined terminal means of a gamer 120 and updates an image with respect to a predetermined game area.

An online game server 110 may designate a game service server associated with MMORPG, which is connected to the terminal means 125 of the gamer 120 via a communication network 130 and provides a game service to the gamer 120 via online. In case that the gamer 120 accesses the online game server 110 by using the terminal means 125 equipped with a program associated with a game, a predetermined game-running data or a game fetch is transmitted to the terminal means 125 and the game service in the online game server 110 may be provided via the program associated with the game driven by the transmitted game-running data or game fetch. Also, the online game server 110 gives authority to control the operation of a predetermined player character to the gamer 120 such that the gamer 120 can control the operation of the player character, thereby providing a full-scale game service.

The gamer 120 is connected to the screen update system 100 via the communication network 130 and may have the terminal means 125 for accessing the communication network 130. The gamer 120 may perform the operations of controlling the operation of the player character, moving a mouse, and selecting an item for running the game. An updated image may be received from the screen update system 100 according to the operation of the gamer 120.

The terminal means 125 commonly designates a device capable of accessing a wired/wireless communication network, which is a terminal including operation ability by including a memory means and equipped with a micro processor, such as a desktop PC, a notebook PC, a PDA, and a mobile communication terminal.

Figure 2:
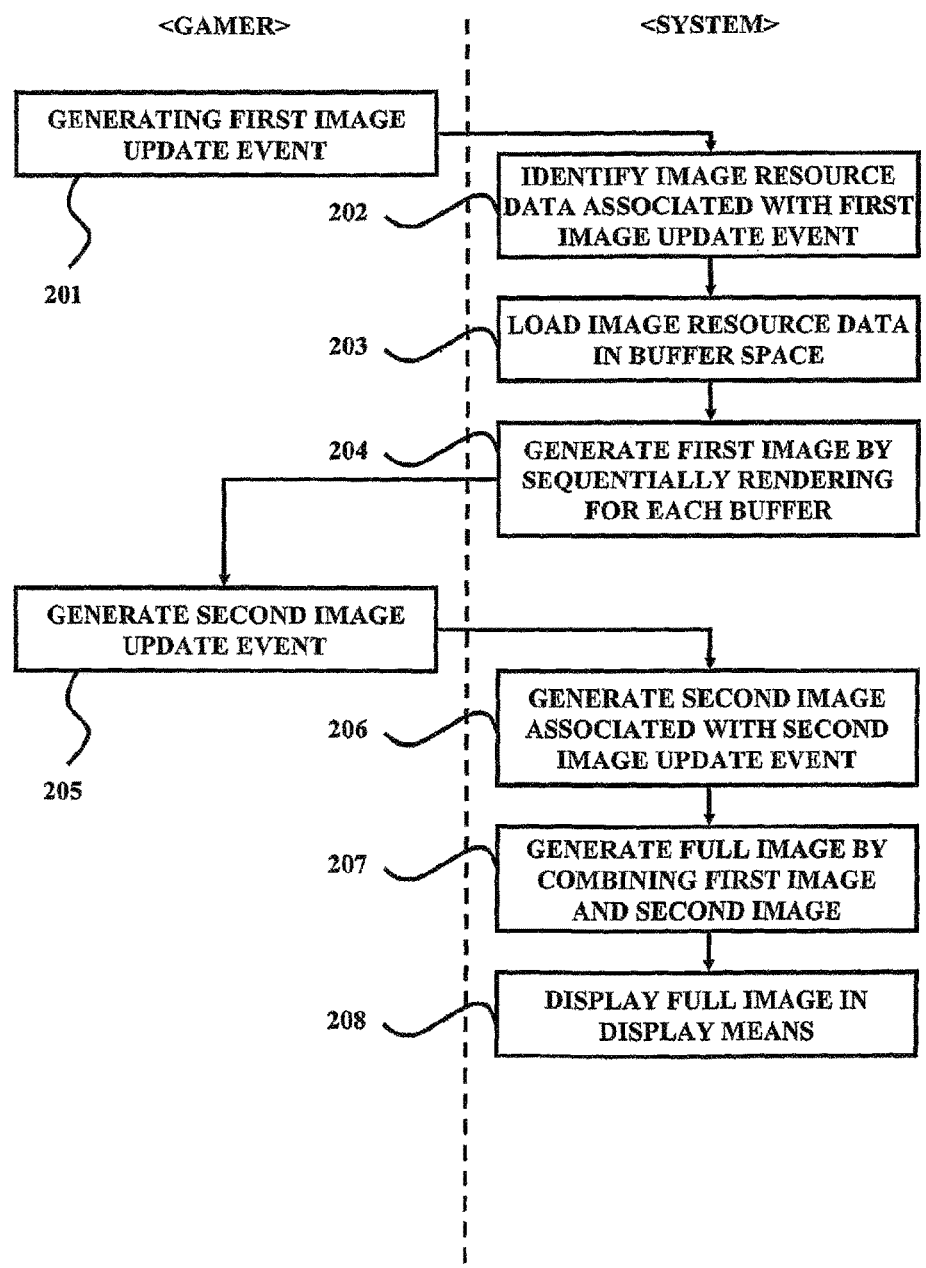
FIG. 2 is a flow chart illustrating an example of a screen update method according to an embodiment of the present invention.

FIG. 2 is a flow chart illustrating an example of a screen update method according to an embodiment of the present invention. The screen update method according to the present embodiment is performed by the screen update system 100.

In Step 201, a gamer generates a first image update event. A first image is generated by rendering image resource data in order to display a three-dimensional image in the game. Hereinafter, the first image and the first image update event will be described in detail with reference to FIG. 3.

Figure 3:
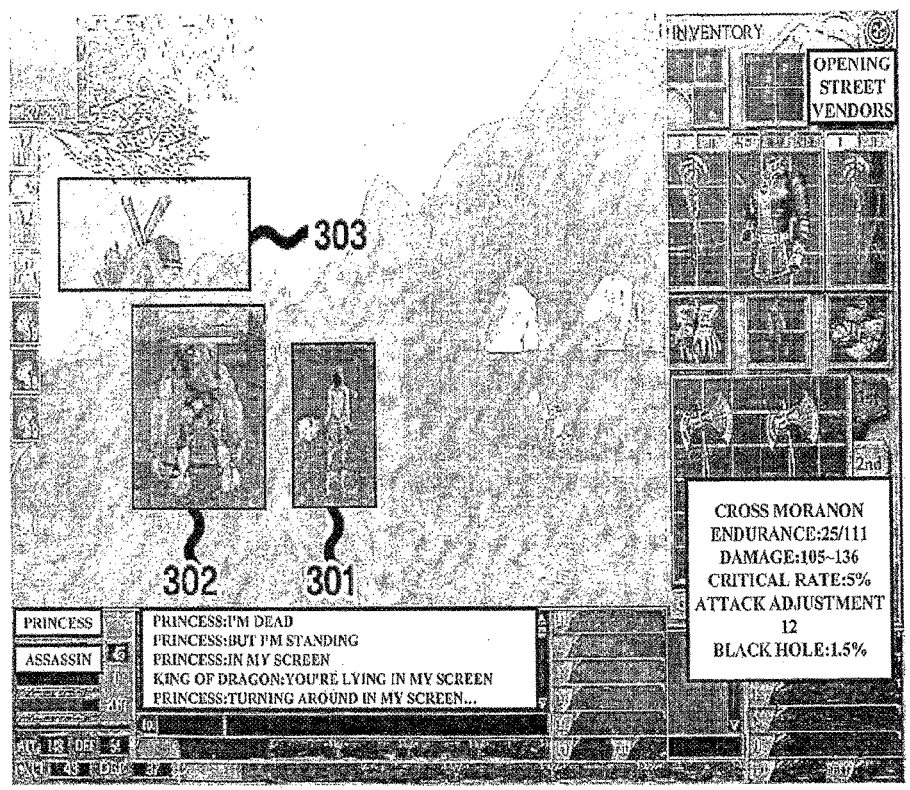
FIG. 3 is a diagram illustrating an example of a first image according to an embodiment of the present invention.

FIG. 3 is a diagram illustrating an example of a first image according to an embodiment of the present invention.

The first image indicates an image displayed in three-dimensions in the game, such as a player character 301, Non-Player Character (NPC) 302, and a dynamic scene 303. The first image update event is generated by a screen update request for changing the operation of a three-dimensional image, such as moving a position or battle action with respect to the first images 301, 302, and 303.

The screen update request means a screen update request with respect to the first image that is rendered for relatively longer time than a second image, namely, whose image update period is relatively longer. For example, in case that a battle occurs between the player character 301 and the NPC 302 or between the player characters or a screen has to be updated due to a change of the operation of the player character 301 and the NPC 302, the first image update event on the first image is generated.

In case that the first image update event is generated, the screen update system 100 identifies the image resource data associated with the first image update event from a predetermined basic recording space in Step 202. Step 202 is a process of recognizing the image resource data requiring screen update in the basic recording space. In this case, the image update event may be generated in association with changing a position of the player character in the game.

Next, in Step 203, the identified image resource data is loaded on a buffer space including a plurality of buffers. The image resource data are loaded in rotation on the buffers by a frame, respectively. The first image of a frame is used for generating a full image as following.

In the present embodiment, it is described as an example that the buffer space for loading the image resource data includes two buffers such as a first buffer and a second buffer. On the other hand, a buffer space including not less than three buffers according to embodiments. Also, the basic recording space and the buffer space may be embodied in a recording device that is physically or logically distinguished.

The screen update system 100 sequentially loads the identified image resource data on the first buffer and the second buffer by a frame. For example, in case that the first image of thirty frames are sequentially generated from a first frame to a thirtieth frame, respectively, if the image resource data corresponding to the first frame is loaded on the first buffer, the image resource data corresponding to the second frame may be loaded on the second buffer. As following, after the first image is generated by using the image resource data loaded on the first buffer, the image resource data corresponding to a third frame is loaded on the first buffer.

As described above, the image resource data corresponding to each frame is sequentially loaded, repeatedly on the first buffer and the second buffer.

Namely, the image resource data from the first frame to the thirtieth frame are loaded in order on the first buffer and second buffer in turn and are rendered in order to guarantee to sequentially update the first image, thereby providing a natural game screen to the gamer.

In Step 204, the screen update system 100 generates the first image at a first frame rate by sequentially rendering the image resource data loaded on the buffer space from each buffer. Step 204 is repeated while the first image update event is maintained. For example, in a case of the movement of the player character, Step 204 is repeated until the player character is moved to a position that the gamer wants. On the other hand, the first image generated as described above forms the game screen together with the second image generated as following.

The first frame rate is associated with a speed of generating/updating the first image. For example, 30 [frames/second] may be selected. Since a computation for real-time rendering a three-dimensional image requires time relatively much more than rendering a two-dimensional image or text, it is difficult by using a current technology that the first image is updated at a frame rate not less than 30 [frames/second] in the terminal means having the extras as a degree of a computer used by a general user, such as PC. However, if the update speed of 30 [frames/second] is guaranteed, the gamer receives a fully natural game screen.

On the other hand, while the first image update event is generated, the screen update system 100 generates/updates the first image by a frame, respectively, by continuously rendering the image resource data loaded on the buffer space.

Particularly, the screen update system 100 generates the first image corresponding to the first frame by rendering the image resource data corresponding to the first frame loaded on the first buffer from a plurality of buffers and generates the first image corresponding to the second frame by rendering the image resource data corresponding to the second frame loaded on the second buffer while the generated first image is displayed. The first image is updated by a method of replacing the first image corresponding to the first frame with the first image corresponding to the second frame.

Next, in Step 205, the gamer generates a second image update event. The second image generated according to the second image update event is an image that may be generated more rapidly than the first image. In some cases, the second image may be generated without rendering. Hereinafter, the second image and the second image update event will be described in detail with reference to FIG. 4.

Figure 4:
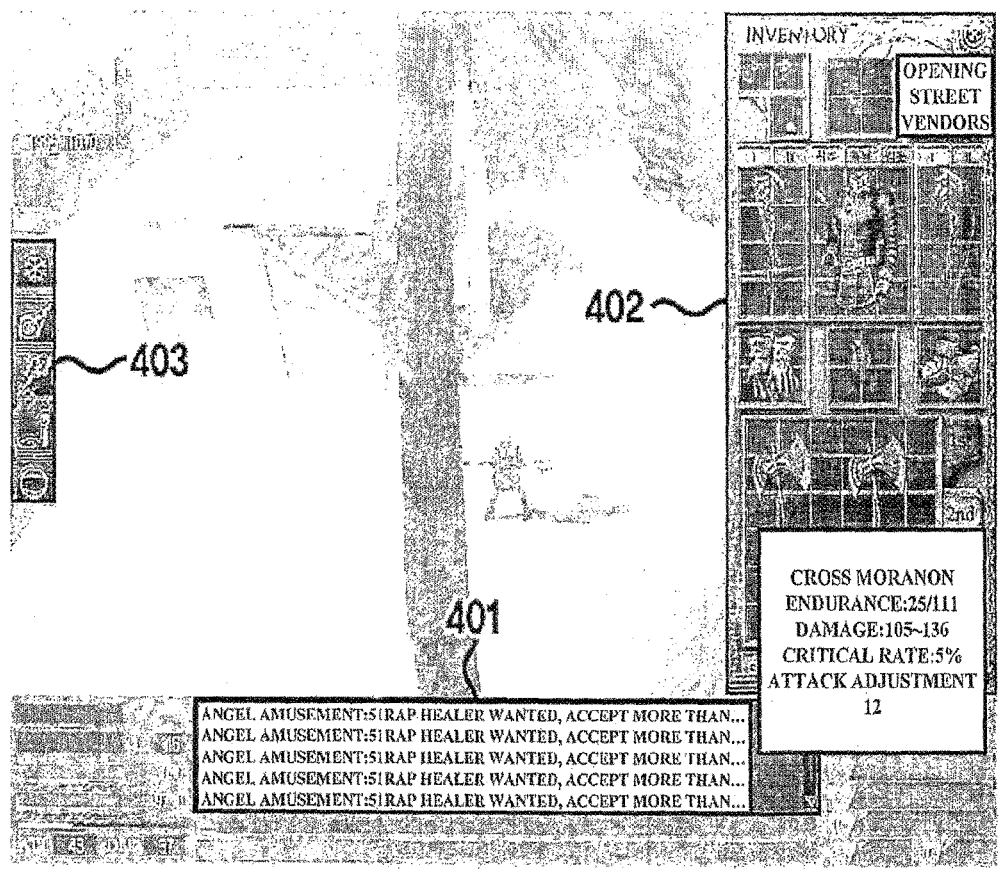
FIG. 4 is a diagram illustrating an example of a second image according to an embodiment of the present invention.

FIG. 4 is a diagram illustrating an example of a second image according to an embodiment of the present invention. The second image indicates an image changed according to moving a mouse pointer by the gamer, inputting a conversation (chat text) of a chat window 401, inputting a gamer interface of an item selecting window 403, or input associated with an inventory window 402 that shows condition information of an item of the gamer to run the game. The second images 401, 402, and 403 do not require time to be used in rendering for updating an image or rendering, namely, an image whose update period may be determined to be very short.

In Step 206, the screen update system 100 generates the second image according to the second image update event at a second frame rate. Step 206 is repeated while the second image update event is continued.

For example, in case that a gamer selects an item included in the inventory window 402, the second image update event occurs. The screen update system 100 moves the mouse for selecting an item and directly generates the second image to reflect on the game screen, instead of loading the image resource data associated with displaying the selected item on the buffer space.

The second frame rate is associated with an update speed of generating and updating the second image and is measured as the number of frames displayed per unit time.

Since the second image is generated without being loaded on the buffer means and there is small amount of computation required to generate the second image, the second image may be generated at higher speed than the first image. Since the second image does not need to be rendered, or if, rendering is required, the amount of computation is not large, the second image may be real-time updated at relatively higher frame rate than the first image. Accordingly, the second frame rate may be selected at [60 frames/second] that is more than the first frame. Also, while the second image update event occurs, the second image is continuously generated/updated and reflected on the game screen in real time.

In Step 207, the screen update system 100 generates a full image by composing the first image with the second image. In this case, a method of overlapping the first image with the second image may be used as a method of composing the first image with the second image. For example, in case that the area besides the second image (401, 402, and 403) of FIG. 4 is blank and the second image is overlapped with the first image, the second image is displayed in the blank area, which is the simplest method of composing.

Also, a composition method may be used, in which an area forming the full image is distinguished into a first area and the second area and the first image is displayed in the first area and the second image is displayed in the second area.

Since the first image and the second image are independently generated via a different process, respectively, as described above, the full image updates every time in case that only the first image is updated or only the second image is updated. Also, according to the present embodiment, in case that only the first image is updated, the full image is updated at the first frame rate, in case that the only the second image is updated, the full image is updated at the second frame rate, and in case that the first image and the second image are simultaneously updated, the full image includes an area updated at the first frame rate and an area updated at the second frame rate, respectively.

In case that the first image update event and the second image update event simultaneously occur, for example, in case that an NPC approaches while the gamer inputs texts in a chat window, since the first image is generated at the update speed of 60 [frames/second] and the second image is generated at the update speed of 30 [frames/second], which is slower than the update speed of the first image, the second image is already generated and applied to the full image while the first image of the first frame is being rendered.

After the second image is already applied to the full image, the first image that is rendered is applied to the full image, thereby updating the full image.

In Step 208, the screen update system 100 displays the full image generated as described above on a display means of the terminal means.

To compare the screen update system 100 according to the present invention with a conventional method, the advantage of the screen update method according to the present invention is clearly known. Since, in a conventional screen update system, in case that Step C (for example, displaying the content of a chat text) and Step A (for example, the movement of a player character) have to be simultaneously processed, a game screen is updated when Step A and Step C are all finished, the game screen is updated at an update speed selected according to the processing speed of step A, which requires much time.

On the other hand, according to the present embodiment, since Step A of generating the first image and Step C of generating the second image are independently processed, respectively, in case that the second image is updated and the first image is not necessary to be updated, the full image can be more rapidly updated because the update speed of the game screen is determined the processing speed of Step C.

Particularly, in case that a lag occurs in real-time rendering, namely, Step A can not be normally processed due to a hindrance occurring in a process of performing Step A, it is difficult to generate in the conventional technology. However, according to the present embodiment, the second image is generated by normally processing Step C and the update of the second image can be reflected on the full image, thereby providing a response with respect to a part of a screen update request to the gamer.

Since gamers feel more oppressed in case that the second image is normally updated, such as the content of the chat text is not normally displayed or the movement speed of the mouse point becomes seriously slow, though the first image is updated at less than 30 [frames/second] due to the lack phenomenon, it is very important to normally update the second image.

Also, in the described embodiment, though it is described that two images such as the first image and second image are generated and updated, respectively, the scope of the present invention includes all construction in which at least two images, such as a first image, a second image, and a third image, are selected and each image is generated and composed at different update speed to generate a full image.

Figure 5:
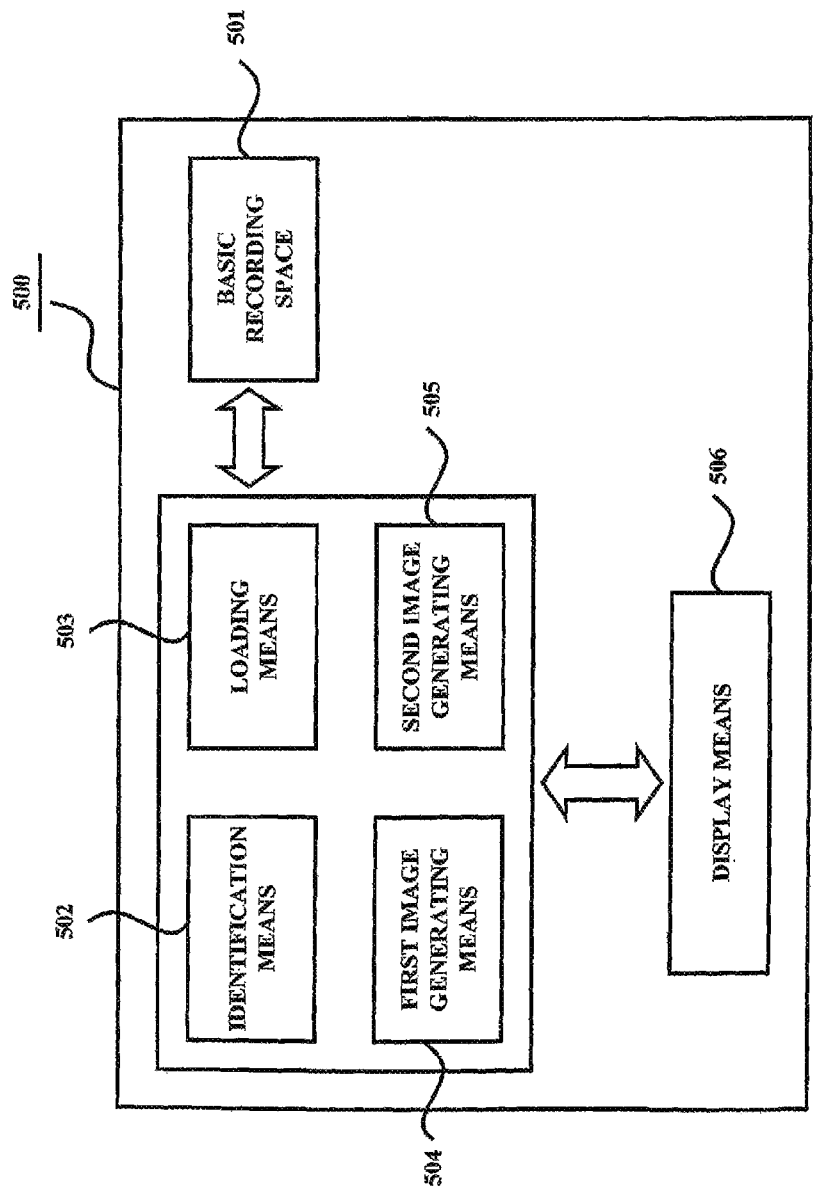
FIG. 5 is a block diagram illustrating a screen update system according to an embodiment of the present invention.

FIG. 5 is a block diagram illustrating a screen update system according to another embodiment of the present invention.

As illustrated in FIG. 5, a screen update system 500 includes a basic recording space 501, an identification means 502, a loading means 503, a first image generating means 504, a second image generating means 505, and a display means 506.

The basic recording space 501 is a unit for storing image resource data, which is a logical and physical recording means for storing the image resource data required in rendering for a screen update event.

The identification means 502 identifies image resource data associated with a first image update event from the basic recording space 501 in case that the first image update event occurs. For example, in case that a player character moves in a predetermined direction, image resource data corresponding to an area to move is identified.

The loading means 503 sequentially loads the image resource data identified in the identification means by a frame on each buffer in a buffer space including a plurality of buffers.

The first image generating means 504 sequentially determines and renders the image resource data loaded on each of the buffer for each buffer, thereby generating a first image. The first image generating means 504 generates the first image at a first frame rate and repeatedly performs a process of generating and updating the first image while the first image update event is maintained.

The second image generating means 505 generates a second image associated with a second image update event in case that the second image update event occurs. The second image generating means 505 generates the second image at a second frame rate and repeatedly performs a process of generating and updating the second image while the second image update event is maintained. The second image does not require a process of rendering or, if the process of rendering is required, a time required to generate the second image is relatively smaller than the first image because the amount of computation is not great. Accordingly, the second frame rate may be set up as relatively higher value than the first frame rate.

The display means 506 generates a full image by compositing the first image and the second image and displays the full image in a display means of the terminal means 125, such as a monitor. For example, the full image may be generated by overlapping the first image with the second image.

In the full image described above, since the first image and the second image are updated at a different update speed, such as the first frame rate or the second frame rate, the second image displaying the content of a chat text is reflected on the full image at a higher speed than the first image.

Also, the embodiments of the present invention include a computer readable medium including a program instruction for executing various operations realized by a computer. The computer readable medium may include a program instruction, a data file, and a data structure, separately or cooperatively. The program instructions and the media may be those specially designed and constructed for the purposes of the present invention, or they may be of the kind well known and available to those skilled in the art of computer software arts.

Figure 6:
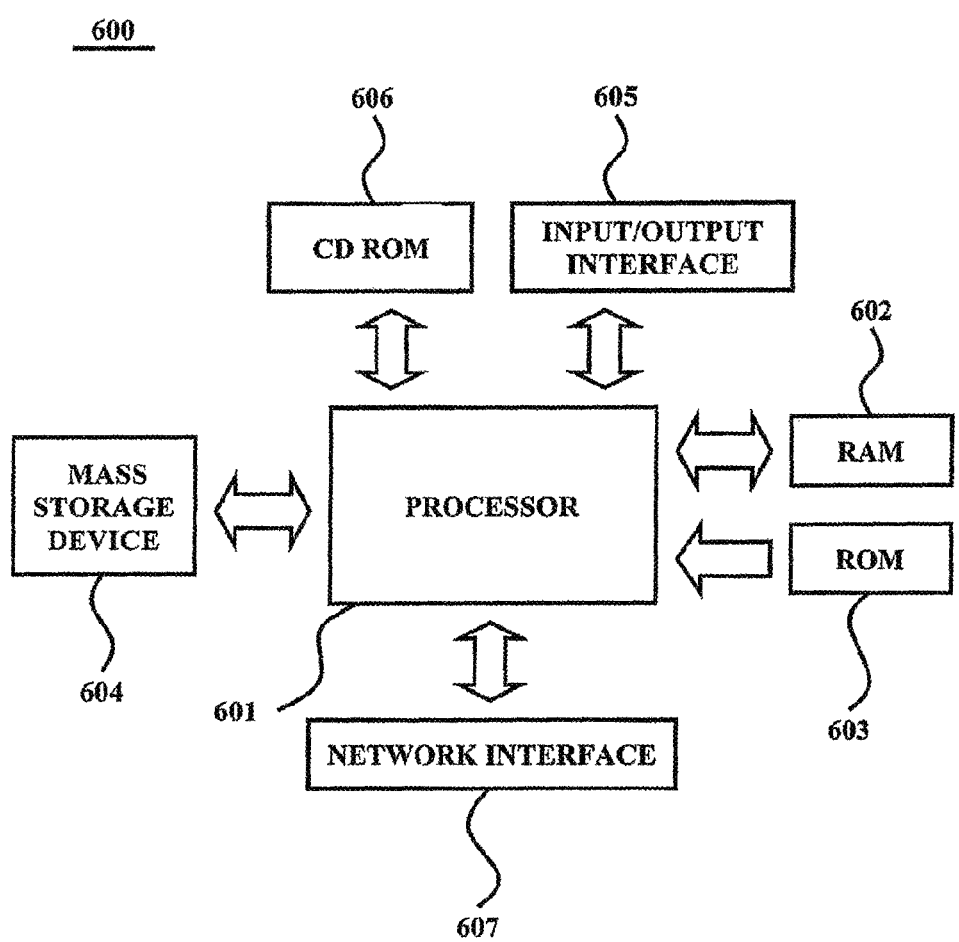
FIG. 6 is a block diagram of the inside of a general use computer apparatus that can be employed in performing the screen update method according to the present invention.

FIG. 6 is a block diagram of the inside of a general use computer apparatus that can be employed in performing the screen update method according to the present invention.

A computer apparatus 600 includes at least one processor 601 connected to a main memory device including a RAM (Random Access Memory) 602 and a ROM (Read Only Memory) 603. The processor 601 is also called as a central processing unit CPU. As well-known to the field of the art, the ROM 603 unidirectionally transmits data and instructions to the CPU, and the RAM 602 is generally used for bidirectionally transmitting data and instructions. The RAM 602 and the ROM 603 may include a certain proper form of a computer readable recording medium. A mass storage device 604 is bidirectionally connected to the processor 601 to provide additional data storage capacity and may be one of the computer readable recording medium. The mass storage device 604 is used for storing programs and data and is an auxiliary memory. A particular mass storage device such as a CD ROM 606 may be used. The processor 601 is connected to at least one input/output interface 605 such as a video monitor, a track ball, a mouse, a keyboard, a microphone, a touch-screen type display, a card reader, a magnetic or paper tape reader, a voice or hand-writing recognizer, a joy stick, and other known computer input/output unit. The processor 601 may be connected to a wired or wireless communication network via a network interface 607. The procedure of the described method can be performed via the network connection. The described devices and tools are well-known to those skilled in the art of computer hardware and software.

The described hardware devices may be formed to be operated by at least one software module in order to perform the operations of the present invention.

Hereinafter, the rendering used in the present invention will be schematically described. The rendering is one of methods of generating an image. For example, the rendering may be used for generating an actual graphic image by realizing a three-dimensional texture such as the variance in colors and density.

Real-time rendering means that images are rapidly generated in computer, which is one of areas in which a mutual action with a user is most active in computer graphics. A speed of displaying an image may be measured by a frames per second:fps. In case that an image is displayed at a speed not less than 15 frames/second as described above, it may be called as real-time rendering. On the other hand, since users can not sense a difference in speed when the speed is more than 75 frames/second, it is not necessary to aimlessly increase an image display speed.

The substantial purpose of real-time rendering is to generate and display an image at a speed that can improve a visual appearance of an object as an image and make a user to sense proper interactivity. In this case, various methods may be used. Particularly, the interactivity may be embodied by acceleration algorithms.

For example, in the real-time rendering, a method of giving a definition of a material and light in order to improve the visual appearance and improving the definition via anti-aliasing, gamma correction, advanced lighting, and shading.

Also, the real-time rendering may use texturing as the acceleration algorithms. The texturing is performed by a method of covering an image on the surface of an object. Culling and pipeline optimization method are used as other examples of the acceleration algorithms.

Though the rendering is schematically described in the above, methods capable of being used in rendering are not limited as described above. Namely, the screen update system according to the present invention may render by using all methods of rendering, such as not only conventional methods of rendering also newly developed rendering methods. It is truly said that the described above belongs to the scope of the present invention.

Now, various methods of rendering are rapidly researched, in which high-quality image is rendered at a speed in which high interactivity can be sensed and a load on a system for rendering is minimized. In case that the conditions as described are complementary to each other, a proper method may be selected by a system designer according to the use, the extras, and the environment of a system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching.

Therefore, it is intended that the scope of the invention be defined by the claims appended thereto and their equivalents.

Although the present invention has been described in connection with the embodiment of the present invention illustrated in the accompanying drawings, it is not limited thereto since it will be apparent to those skilled in the art that various substitutions, modifications and changes may be made thereto without departing from the scope and spirit of the invention.

As used in this application, the term "module" is intended to refer to, but is not limited to, a software or hardware component, which performs certain tasks. A module or component may advantageously be configured to reside on the addressable storage medium and configured to execute on one or more processors. Thus, a module or component may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. Section 112, sixth paragraph, unless the element is expressly recited using the phrase "means for" or, in the case of a method claim, the element is recited using the phrase "step for."

INDUSTRIAL APPLICABILITY

According to the present invention, there is provided a screen update method and system, in which at least two sorts of images which can be respectively generated by different processors by using different methods are generated at a different update speed and the at least two images are composed, thereby updating a full image.

According to the present invention, there is also provided a screen update method and system, in which respective processes to be processed for embodying a full image are divided for each update speed and dependently processed, thereby preventing the update speed of the full image from being reduced together with a slowest process.

According to the present invention, there is provided a screen update method and system, in which an image area that has to be rapidly responded to a request of a gamer, such as displaying the content of a chat text and displaying the movement of a mouse point can be updated at higher speed in rendering a game screen and if a lack is generated in generating a three-dimensional image, there is no bad effect in updating the image.

What is claimed is:

1. A method of updating images displayed on a display device, executed by at least one processor, the method comprising:
    identifying, by at least one processor, image resource data associated with an update event for a first image from a basic recording space when the update event for the first image occurs, the first image comprising an image displayed in three-dimensions in a game;
    generating the update event for the first image by a screen update request;
    loading, by at least one processor, the identified image resource data in a buffer space including a plurality of buffers;
    generating, by at least one processor, the first image at a first frame rate by sequentially rendering the loaded image resource data;
    generating, by at least one processor, a second image associated with an update event for the second image at a second frame rate when the update event for the second image occurs, the
    second image is generated without being rendered;
    compositing, by at least one processor, the first image with the second image; and
    updating, by at least one processor, at least a portion of the display device to display the composite image,
    wherein the first frame rate is less than the second frame rate.

2. The method of claim 1, wherein the image resource data for the first image is loaded in rotation on the buffer space by frame, respectively.

3. The method of claim 1, wherein the image resource data of the second image is not loaded in the buffer space.

4. The method of claim 1, wherein the second image comprises an image for displaying a chat or a mouse pointer movement in a game.

5. The method of claim 4, wherein the second image further comprises an item selecting window including item state information.

6. The method of claim 1, wherein:
    the step of generating the first image is repeated while the update event for the first image lasts.

7. The method of claim 1, wherein:
    the first image comprises one of a player character, a Non-Player Character (NPC), and a dynamic scene in a three dimensional network game.

8. The method of claim 7,
    wherein the screen update request comprises one of changing operation of a three-dimensional image or a user input, and
    wherein the screen update request comprises moving a position or action of the first image.

9. The method of claim 7, wherein the three dimensional network game comprises a Massively Multi-player Online Role Playing Game (MMORPG) comprising a plurality of users simultaneously participating via online in a broadband game area.

10. The method of claim 1, wherein the step of compositing the first image with the second image includes a step of generating the composited image by overlapping the first with the second image.

11. The method of claim 1, wherein the step of generating the second image is repeated while the update event for the second image lasts.

12. The method of claim 11, wherein a user input initiates the update event for the second image.

13. The method of claim 1, wherein
the composited image comprises a full image,
when only the update event for the first image occurs, only the first image is updated and the full image is updated at the first frame rate,
when only the update event for the second image occurs, only the second image is updated and the full image is updated at the second frame rate, and
when the first image and the second image are simultaneously updated, the full image includes a first area updated at the first frame rate and a second area updated at the second frame rate.

14. The method of claim 1, wherein the first image and the second image are generated by different processors by using different methods at a different update speed.

15. A non-transitory computer readable storage medium encoded with a program for executing the method recited in claim 1.

16. A system for updating images displayed on a display device, the system comprising:
a basic recording space to store image resource data; and
at least one processor comprising:
an identification module configured to identify image source data associated with an update event for a first image from the basic recording space when the update event for the first image occurs, the first image comprising an image displayed in three-dimensions in a game and the update event being generated by an update request to change the first image,
a loading module configured to sequentially load the identified image resource data for each buffer by frame in a buffer space including a plurality of the buffers,
a first image generating module configured to sequentially determine the image resource data loaded on the buffer, to render the determined image resource data, and to generate the first image at a first frame rate,
a second image generating module configured to generate a second image associated with a second image update event at a second frame rate when the update event for the second image is occurs, the second image is generated without being rendered; and
a display module configured to generate an entire image by compositing the first image with the second image and to display the entire image on a predetermined display module,
wherein the first frame rate being less than the second frame rate.

17. The system of claim 16, wherein the image resource data of the second image is not loaded in the buffer space.

18. The system of claim 16, wherein the second image comprising an image for displaying a chat or a mouse pointer movement in a game.

19. The system of claim 16, wherein the at least one processor comprises a first processor and a second processor, and the first image and the second image are generated by the first and second processors respectively by using different methods at a different update speed.

* * * * *